(12) United States Patent
Savvides et al.

(10) Patent No.: US 12,165,068 B2
(45) Date of Patent: Dec. 10, 2024

(54) CONVEX FEATURE NORMALIZATION FOR FACE RECOGNITION

(71) Applicant: CARNEGIE MELLON UNIVERSITY, Pittsburgh, PA (US)

(72) Inventors: Marios Savvides, Pittsburgh, PA (US); Dipan Kumar Pal, Pittsburgh, PA (US); Yutong Zheng, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1048 days.

(21) Appl. No.: 16/968,040

(22) PCT Filed: Feb. 28, 2019

(86) PCT No.: PCT/US2019/020090
§ 371 (c)(1),
(2) Date: Aug. 6, 2020

(87) PCT Pub. No.: WO2019/169155
PCT Pub. Date: Sep. 6, 2019

(65) Prior Publication Data
US 2021/0034984 A1 Feb. 4, 2021

Related U.S. Application Data
(60) Provisional application No. 62/710,814, filed on Feb. 28, 2018.

(51) Int. Cl.
*G06N 3/084* (2023.01)
*G06F 17/16* (2006.01)
*G06V 40/16* (2022.01)

(52) U.S. Cl.
CPC ............. *G06N 3/084* (2013.01); *G06F 17/16* (2013.01); *G06V 40/168* (2022.01)

(58) Field of Classification Search
CPC .......... G06F 17/16; G06F 7/544; G06F 15/18; G06F 7/76; G06N 3/084; G06N 7/00; G06K 9/6215; G06K 9/6253; G06K 9/00268; G06K 9/00986; G06V 40/168
See application file for complete search history.

(56) References Cited

U.S. PATENT DOCUMENTS

| | | | | |
|---|---|---|---|---|
| 2013/0132315 A1* | 5/2013 | Principe | ................ | G06F 18/22 706/20 |
| 2016/0307071 A1* | 10/2016 | Perronnin | ............. | G06F 18/214 |
| 2016/0307565 A1* | 10/2016 | Liu | ........................ | G06N 20/00 |

(Continued)

OTHER PUBLICATIONS

Heo, Jingu, and Marios Savvides. "Real-time face tracking and pose correction for face recognition using active appearance models." Biometric Technology for Human Identification IV. vol. 6539. SPIE, 2007. (Year: 2007).*

(Continued)

*Primary Examiner* — Randall K. Baldwin
(74) *Attorney, Agent, or Firm* — KDW FIRM PLLC

(57) ABSTRACT

A method of training a deep neural network, such as would be used in facial recognition, includes training the deep neural network to normalize feature vectors to a learned value representing the radius of a multi-dimensional hypersphere using a convex augmentation of the primary loss function.

14 Claims, 7 Drawing Sheets

(56) References Cited

U.S. PATENT DOCUMENTS

2017/0300811 A1* 10/2017 Merhav ............... G06N 3/084
2021/0165852 A1* 6/2021 Granger ............... G06V 10/82

OTHER PUBLICATIONS

Abiantun, Ramzi, Utsav Prabhu, and Marios Savvides. "Sparse feature extraction for pose-tolerant face recognition." IEEE transactions on pattern analysis and machine intelligence 36.10 (2014): 2061-2073. (Year: 2014).*

Juefei-Xu, Felix, Dipan K. Pal, and Marios Savvides. "NIR-VIS heterogeneous face recognition via cross-spectral joint dictionary learning and reconstruction." Proceedings of the IEEE conference on computer vision and pattern recognition workshops. 2015. (Year: 2015).*

Pal, Dipan K., Felix Juefei-Xu, and Marios Savvides. "Discriminative invariant kernel features: a bells- and-whistles-free approach to unsupervised face recognition and pose estimation." Proceedings of the IEEE Conference on Computer Vision and Pattern Recognition. 2016: 5590-5599 (Year: 2016).*

Peng, Xi, Nalini Ratha, and Sharathchandra Pankanti. "Learning face recognition from limited training data using deep neural networks." 2016 23rd International Conference on Pattern Recognition (ICPR). IEEE, 2016: 1442-1447 (Year: 2016).*

Wen, Yandong, et al. "A discriminative feature learning approach for deep face recognition." Computer Vision-ECCV 2016: 14th European Conference, Amsterdam, The Netherlands, Oct. 11-14, 2016, Proceedings, Part VII 14. Springer International Publishing, 2016: 499-515 (Year: 2016).*

Ranjan, Rajeev, Carlos D. Castillo, and Rama Chellappa. "L2-constrained softmax loss for discriminative face verification." arXiv preprint arXiv:1703.09507 (2017). (Year: 2017).*

Liu, Weiyang, et al. "Sphereface: Deep hypersphere embedding for face recognition." Proceedings of the IEEE conference on computer vision and pattern recognition. 2017: 212-220 (Year: 2017).*

Yuan, Yuhui, Kuiyuan Yang, and Chao Zhang. "Feature incay for representation regularization." arXiv preprint arXiv:1705.10284 (2017). (Year: 2017).*

Hasnat, Md Abul, et al. "von mises-fisher mixture model-based deep learning: Application to face verification." arXiv preprint arXiv:1706.04264 (2017): 1-16 (Year: 2017).*

Wang, Feng, et al. "Normface: L2 hypersphere embedding for face verification." Proceedings of the 25th ACM international conference on Multimedia. 2017: 1041-1049 (Year: 2017).*

Wang, Hao, et al. "CosFace: Large Margin Cosine Loss for Deep Face Recognition." arXiv preprint arXiv:1801.09414v1 (Jan. 2018): 1-12. (Year: 2018).*

Thornton, Jason, Marios Savvides, and BVK Vijaya Kumar. "Enhanced iris matching using estimation of in-plane nonlinear deformations." Biometric Technology for Human Identification III. vol. 6202. SPIE, 2006. (Year: 2006).*

Zheng, Yutong, et al. "Towards a deep learning framework for unconstrained face detection." 2016 IEEE 8th International Conference on Biometrics Theory, Applications and Systems (BTAS). IEEE, 2016. (Year: 2016).*

Zhu, Chenchen, et al. "Weakly supervised facial analysis with dense hyper-column features." Proceedings of the IEEE Conference on Computer Vision and Pattern Recognition Workshops. 2016. (Year: 2016).*

Aslan, Melih S., et al. "Multi-channel multi-model feature learning for face recognition." Pattern Recognition Letters 85 (2017): 79-83. (Year: 2017).*

Qi, Xianbiao, and Lei Zhang. "Face recognition via centralized coordinate learning." arXiv preprint arXiv:1801.05678 (Jan. 2018): 1-14 (Year: 2018).*

Abiantun, Ramzi, and Marios Savvides. "Boosted multi image features for improved face detection." 2008 37th IEEE Applied Imagery Pattern Recognition Workshop. IEEE, 2008. (Year: 2008).*

Juefei-Xu, Felix, and Marios Savvides. "Subspace-based discrete transform encoded local binary patterns representations for robust periocular matching on NIST's face recognition grand challenge." IEEE transactions on image processing 23.8 (2014): 3490-3505. (Year: 2014).*

Juefei-Xu, Felix, Vishnu Naresh Boddeti, and Marios Savvides. "Gang of GANs: Generative adversarial networks with maximum margin ranking." arXiv preprint arXiv:1704.04865 (2017). (Year: 2017).*

Le, T. Hoang Ngan, et al. "Semi self-training beard/moustache detection and segmentation simultaneously." Image and Vision Computing 58 (2017): 214-223. (Year: 2017).*

Supplementary European Search Report for European Patent Application No. 19760160.2 mailed on Oct. 20, 2021, 5 pages.

Wen et al., "A Discriminative Feature Learning Approach for Deep Face Recognition", Computer Vision—ECCV 2016, Springer International Publishing, pp. 499-515, Sep. 16, 2016.

Ranjan et al., "L2-constrained Softmax Loss for Discriminative Face Verification", Jun. 7, 2017, Retrieved from Internet URL: <https://arxiv.org/pdf/1703.09507.pdf>, Retrieved on Jul. 24, 2020, 10 pages.

Wang et al., "NormFace: L2 Hypersphere Embedding for Face Verification", Jul. 26, 2017, Retrieved from Internet URL: <https://arxiv.org/pdf/1704.06369.pdf>, Retrieved on Feb. 18, 2020, pp. 1-11.

International Search Report and Written Opinion for International Patent Application No. PCT/US19/20090 mailed on May 23, 2019, 8 pages.

Wang et al., "CosFace: Large Margin Cosine Loss for Deep Face Recognition", Cornell University Library, Computer Science, Computer Vision and Pattern Recognition, Jan. 29, 2018, [online], Retrieved from the Internet <URL: https://arxiv.org/abs/1801.09414>, Retrieved on May 2, 2019, 12 pages.

* cited by examiner

CONVEX FEATURE NORMALIZATION FOR FACE RECOGNITION

RELATED APPLICATIONS

This application is a national phase filing under 35 U.S.C. § 371 claiming the benefit of and priority to International Patent Application No. PCT/US2019/020090, filed on Feb. 28, 2019, which claims the benefit of U.S. Provisional Patent Application No. 62/710,814, filed Feb. 28, 2018. The entire contents of these applications are incorporated herein by reference.

GOVERNMENT RIGHTS

This invention was made with government support under N6833516C0177 awarded by the US Navy. The government has certain rights in the invention.

BACKGROUND OF THE INVENTION

Deep learning has demonstrated impressive performance on a variety of tasks. Arguably the most important task, that of supervised classification, has led to many advancements. Notably, the use of deeper structures and more powerful loss functions have resulted in far more robust feature representations. There has also been more attention on obtaining better-behaved gradients through normalization of batches or weights.

One of the most important practical applications of deep networks with supervised classification is face recognition. Robust face recognition poses a challenge as it is characterized by a very large number of classes with relatively few samples per class for training with significant nuisance transformations.

A good understanding of the challenges in this task results in a better understanding of the core problems in supervised classification, and in general representation learning. However, despite the impressive attention on face recognition tasks over the past few years, there are still many gaps the understanding of this task. Notably, the need and practice of feature normalization. Normalization of features provides significant improvement in performance which implicitly results in a cosine embedding. However, direct normalization in deep networks in a non-convex formulation results in local minima generated by the loss function.

A common primary loss function is Softmax. Proposals have been made to use norm constraints before the Softmax loss is applied. However, the formulations investigated are non-convex in the feature representations leading to difficulties in optimization. Further, there is a need for better understanding of the benefits of normalization itself. The 'radial' nature of the Softmax features, as shown in FIG. 1, do not appear to be a useful property, and, as such, cosine similarity should may be a better method leading to normalized features. The Softmax loss encodes the quality of the data (images) into the norm, thereby deviating from the ultimate objective of learning a good representation purely for classification. Therefore, for better classification, normalization forces the network to be invariant to such details.

SUMMARY OF THE INVENTION

Described herein is a novel approach to normalization, known as "Ring Loss". This method may be used to normalize all sample features through a convex augmentation of the primary loss function. The value of the target norm is also learned during training. Thus, the only hyperparameter in Ring Loss is the loss weight with respect to the primary loss function.

Deep feature normalization is an important aspect of supervised classification problems the model is required to represent each class in a multi-class problem equally well. The direct approach to feature normalization through a hard normalization operation results in a non-convex formulation. Instead, Ring Loss applies soft normalization, where it gradually learns to constrain the norm to the scaled unit circle, while preserving convexity leading to more robust features.

Feature matching during testing in face recognition is typically done through cosine distance creating a gap between testing and training protocols which do not utilize normalization. The incorporation of Ring Loss during training eliminates this gap. Ring Loss allows for seamless and simple integration into deep architectures trained using gradient-based methods. Ring Loss provides consistent improvements over a large range of its hyperparameter when compared to other baselines in normalization and other losses proposed for face recognition in general. Ring Loss also helps by being robust to lower resolutions through the norm constraint.

DETAILED DESCRIPTION

Figure 1:
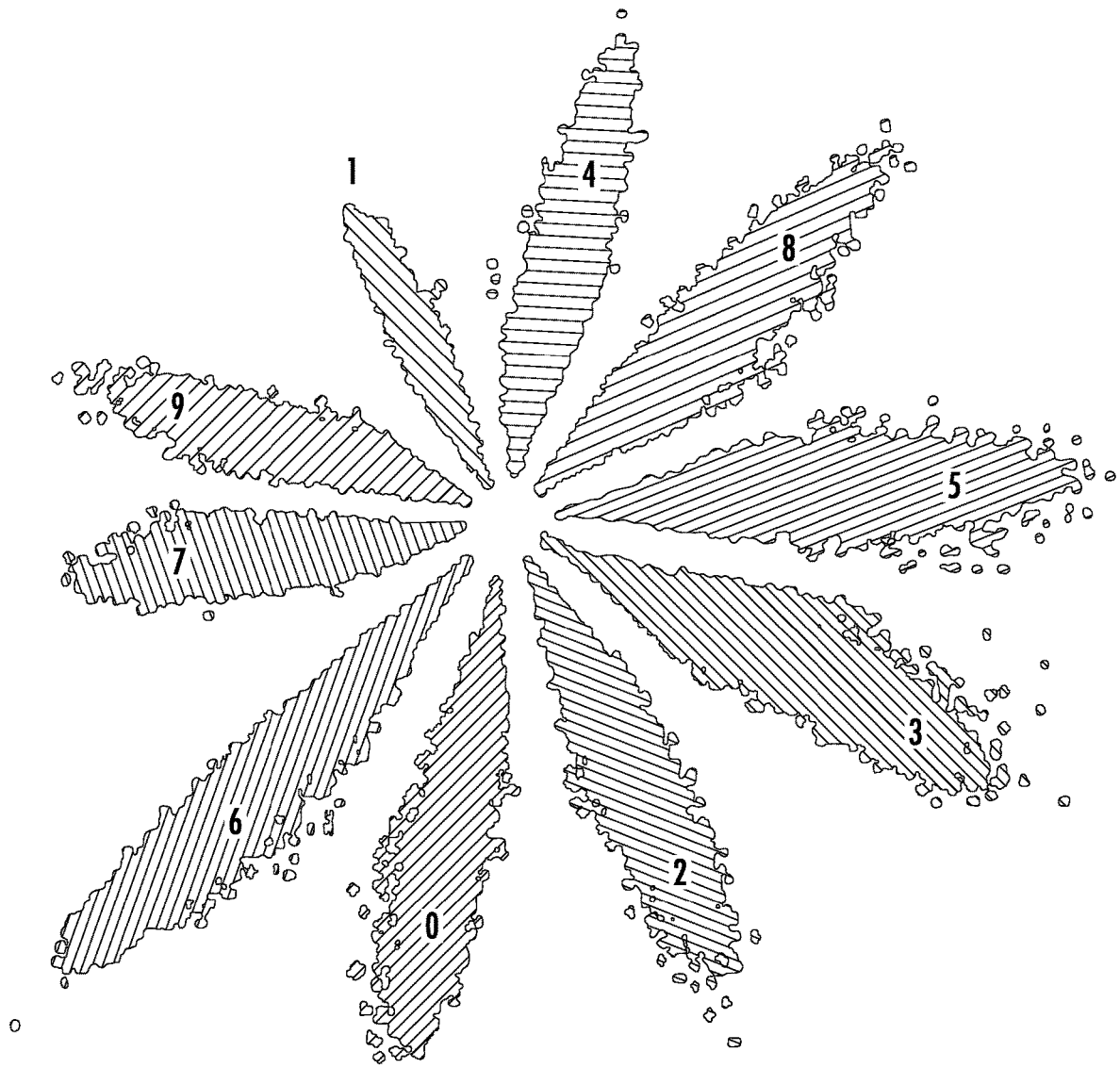
FIG. 1 shows sample MNIST features trained using Softmax as the primary loss function.
Figure 2:
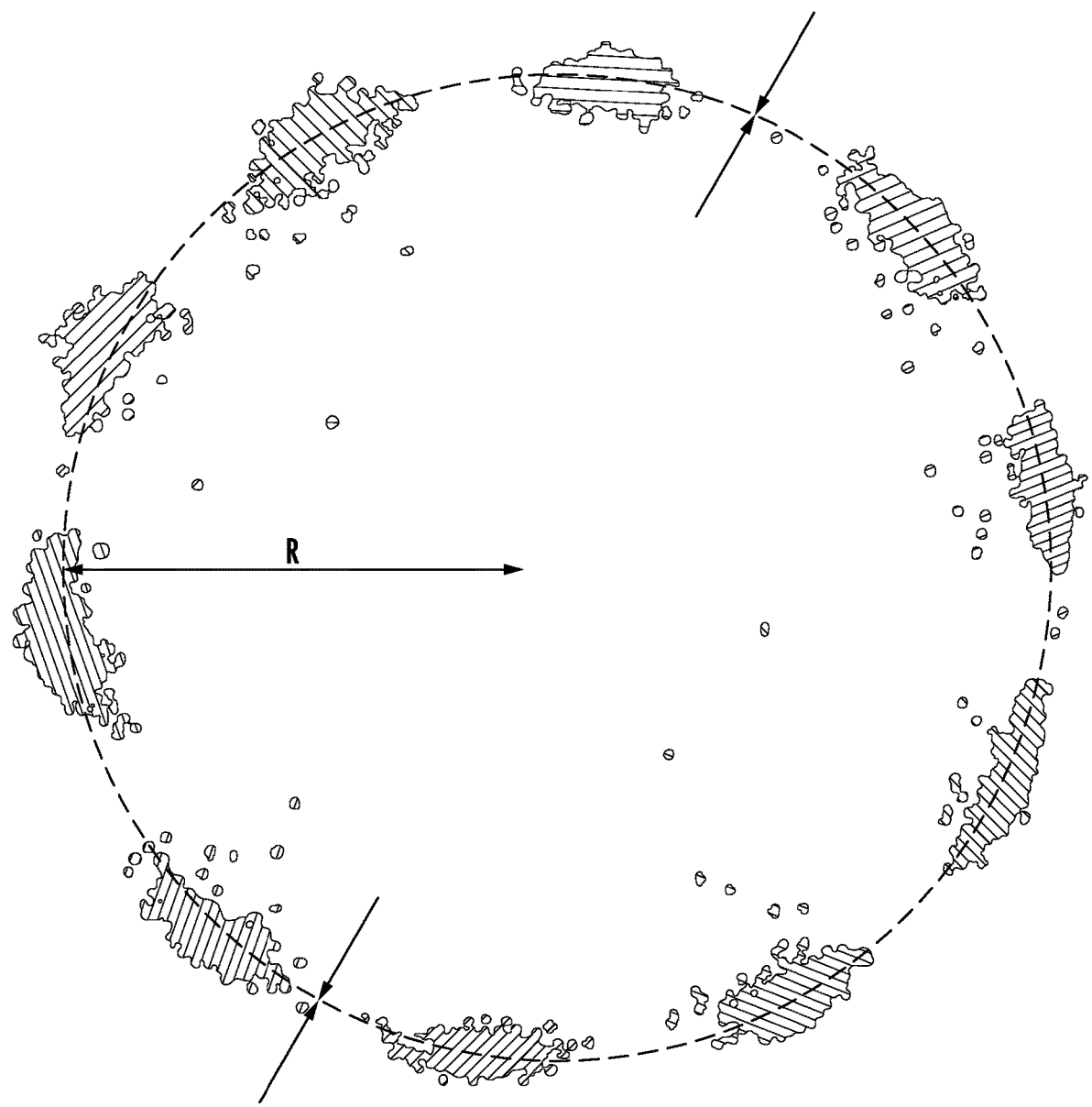
FIG. 2 shows the Ring Loss method augmenting the primary loss function.

The Ring Loss augmentation method constrains the radial classifications of the Softmax loss function, shown in FIG. 1, to classification regions clustered around a given radius R, as shown in FIG. 2. Ring loss uses a convex norm constraint to gradually enforce normalization of features to a learned norm value R. This results in features of equal length while mitigating classification margin imbalance between classes.

The Ring Loss method provides three main advantages over the use of the un-augmented Softmax as the loss function: 1) The norm constraint is beneficial to maintain a balance between the angular classification margins of multiple classes; 2) Ring Loss removes the disconnect between training and testing metrics; and 3) Ring Loss minimizes test errors due to angular variation due to low norm features.

The Angular Classification Margin Imbalance. Consider a binary classification task with two feature vectors $x_1$ and $x_2$ from classes 1 and 2 respectively, extracted using some model (possibly a deep network). Let the classification weight vector for class 1 and 2 be $\omega_1$ and $\omega_2$ respectively. The primary loss function may be, for example, Softmax.

Figure 3:
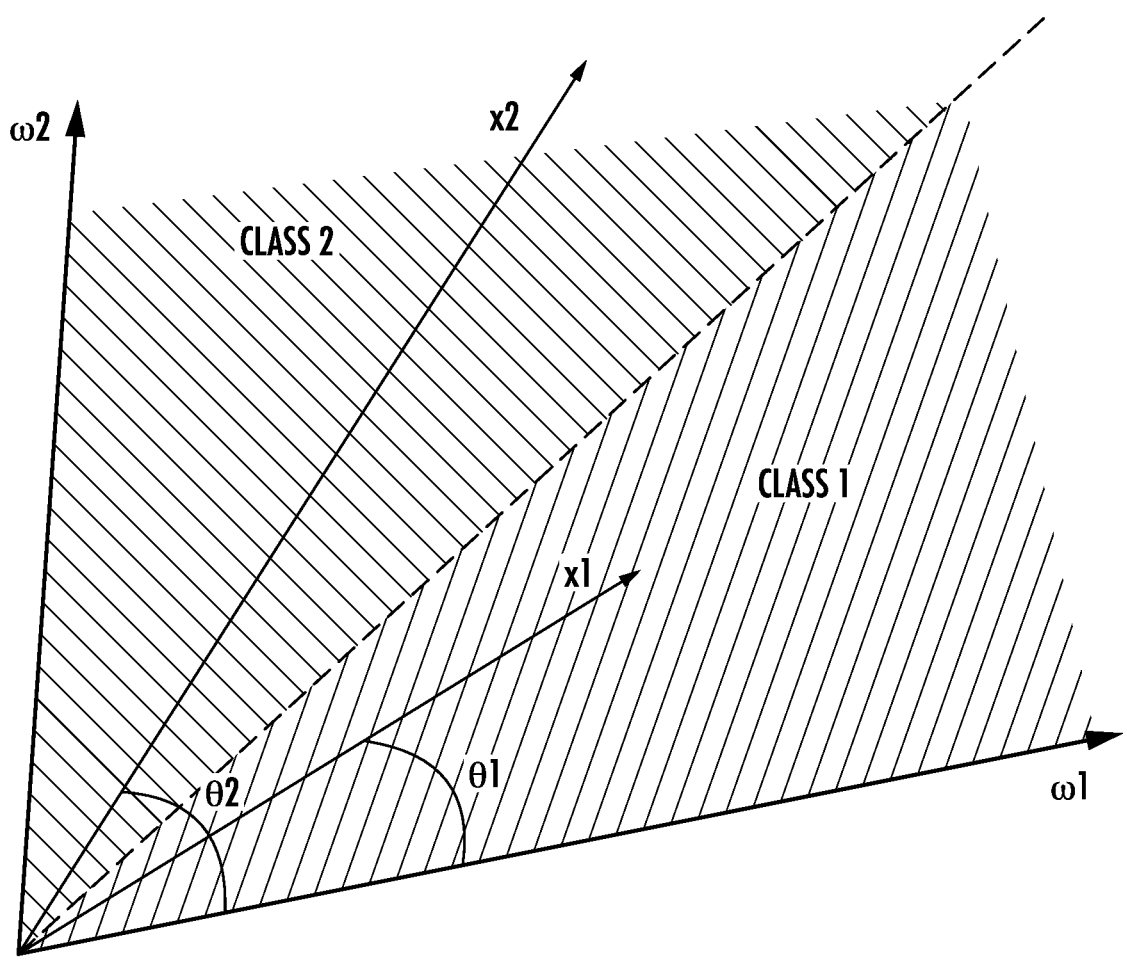
FIG. 3 shows a simple case of binary classification.
Figure 4:
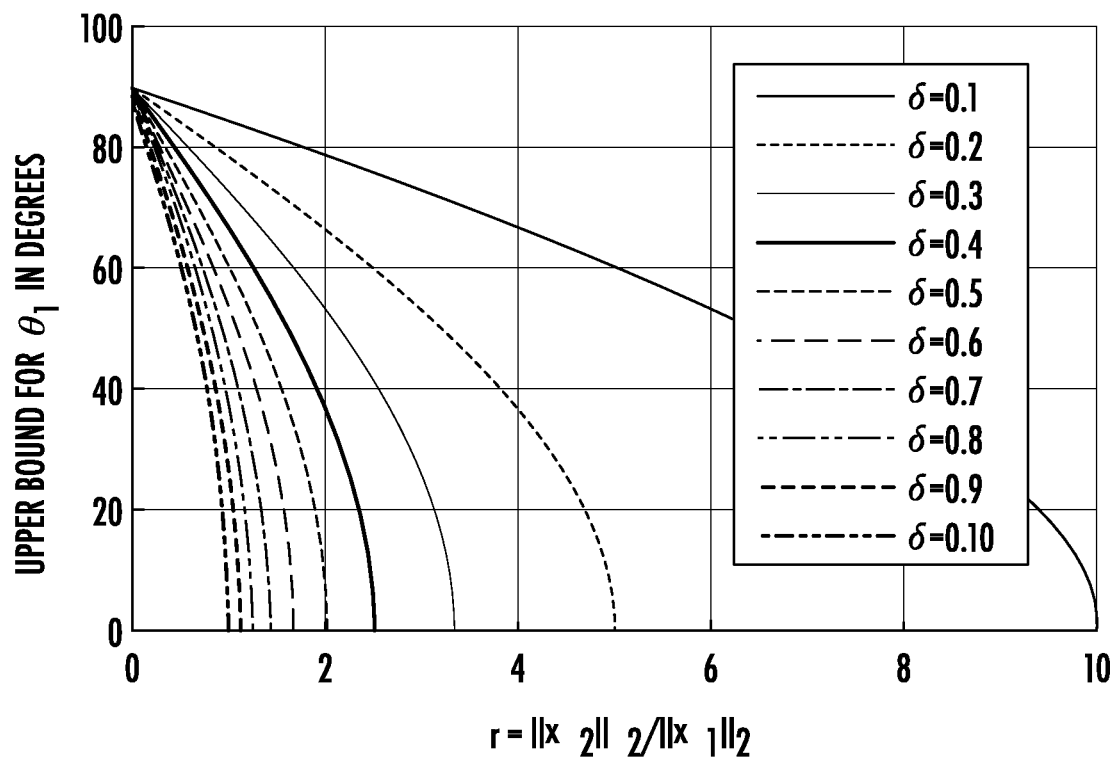
FIG. 4 shows a graph of angular classification margin for $\theta_1$ for different $\delta = \cos \theta_2$.

An example arrangement is shown in FIG. 3 showing a simple case of binary classification. The shaded regions denote the classification margin (for class 1 and 2). FIG. 4 shows angular classification margin for $\theta_1$ for different $\delta = \cos \theta_2$.

In general, for the class 1 vector $\omega_1$ to pick $x_1$ and not $x_2$ for correct classification, it is required that $\omega_1^T x_1 > \omega_1^T x_2 \Rightarrow \|x_1\|_2 \cos \theta_1 > \|x_2\|_2 \cos \theta_2$. Here, $\theta_1$ and $\theta_2$ are the angles between the weight vector $\omega_1$ (class 1 vector only) and $x_1$, $x_2$ respectively. The feasible set (range for $\theta_1$) required for this inequality to hold is known as the angular classification margin. Note that it is also a function of $\theta_2$. Setting $$\frac{\|x_2\|_2}{\|x_1\|_2} = r,$$

(r>0) for correct classification, it is required that $\cos \theta_1 > r \cos \theta_2 \Rightarrow \theta_1 < \cos^{-1}(r \cos \theta_2)$ as $\cos \theta$ is a decreasing function between $[-1, 1]$ for $\theta \in [0, \pi]$. This inequality needs to hold true for any $\theta_2$.

Fixing $\cos \theta_2 = \delta$, results in $\theta_1 < \cos^{-1}(r\delta)$. From the domain constraints of $\cos^{-1}$, we have $$-1 \le r\delta \le 1 \Rightarrow \frac{-1}{\delta} \le r \le \frac{1}{\delta}.$$

Combining this inequality with r>0, result in $$0 < r \le \frac{1}{|\delta|} \Rightarrow \|x_2\|_2 \le \frac{1}{\delta}\|x_1\|_2 \forall \delta \in [0, 1].$$

For these purposes it suffices to only look at the case $\delta$>0 because $\delta$<0 doesn't change the inequality $-1 \le r\delta \le 1$.

Discussion on the angular classification margin. The upper bound on $\theta_1$ (i.e., $\cos^{-1}(r \cos \theta_2)$) is plotted for a range of $\delta$ ([0.1, 1]) and the corresponding range of r. FIG. 4 shows the plot. Consider $\delta$=0.1, which implies that the sample $x_2$ has a large angular distance from $\omega_1$ (about 85°). This case is favorable in general because it would be expected that a lower probability of $x_2$ would be classified as class 1. However, it can be seen that, as r increases (difference in norm of $x_1$, $x_2$), the classification margin for $x_1$ decreases from 90° to, eventually, 0°.

In other terms, as the norm of $x_2$ increases, with respect to $x_1$, the angular margin for $x_1$ to be classified correctly while rejecting $x_2$ by $\omega_1$ decreases. The difference in norm (r>1) therefore will have an adverse effect during training by effectively enforcing smaller angular classification margins for classes with smaller norm samples. This also leads to lopsided classification margins for multiple classes due to the difference in class norms, as can be seen in FIG. 1. This effect is only magnified as $\delta$ increases (or the sample $x_2$ comes closer to $\omega_1$). FIG. 4 shows that the angular classification margin decreases much more rapidly as $\delta$ increases. However, r<1 leads to a larger margin and seems to be beneficial for classifying class 1 (as compared to r>1). One might argue that this suggests that the r<1 should be enforced for better performance. However, note that the same reasoning applies correspondingly to class 2, where we want to classify $x_2$ to $\omega_2$ while rejecting $x_2$. This creates a trade off between performance on class 1 versus class 2 based on r which also directly scales to multi-class problems. In typical recognition applications, such as face recognition, this is not desirable. Ideally, all classes would be represented equally well. Setting r=1 or constraining the norms of the samples from both classes to be the same ensures this.

Effects of Softmax on the norm of MNIST features. The effects of Softmax on the norm of the features (and thereby classification margin) on MNIST can be qualitatively observed in FIG. 1, which shows classes labelled 0-9. It can be seen that classes 3, 6 and 8 have large norm features, which are typically the classes that are harder to distinguish between. Therefore, observing r<1 for these three 'difficult' classes (with respect to the other 'easier' classes) thereby provides a larger angular classification margin to the three classes. On the other hand, classes 1, 9 and 7 have lower norms corresponding to r>1 with respect to the other classes, because the model can afford to decrease the margin for these 'easy' classes as a trade-off. It can also be observed that, arguably, the most easily distinguishable class, class 1, has the lowest norm and therefore the highest r.

FIG. 2 showcases the same features learned using Softmax augmented with the Ring Loss method, which forces the network to learn feature normalization through a convex formulation, thereby mitigating this imbalance in angular classification margins.

Removing the disconnect between training and testing. Evaluation using the cosine metric is currently ubiquitous in applications such as face recognition, where the features are normalized beforehand in gallery (thereby requiring fewer FLOPs during large scale testing). However, during training, this is not the case and the norm is usually not constrained. This creates a disconnect between training and testing scenarios which hinders performance. The Ring Loss method removes this disconnect in an elegant way.

Regularizing Softmax Loss with the Norm Constraint. The ideal training scenario for a system testing under the cosine metric would be where all features pointing in the same direction have the same loss. However, this is not true for the most commonly used loss function, Softmax and its variants (FC layer combined with the Softmax function and the cross-entropy loss). Assuming that the weights are normalized (i.e. $\|\omega_k\|=1$), the Softmax loss for feature vector $\mathcal{F}(x_i)$ can be expressed as (for the correct class $y_i$) as:

$$L_{SM} = -\log \frac{\exp \omega_k \mathcal{F}(x_i)}{\sum_{k'=1}^{K} \exp \omega_{k'} \mathcal{F}(x_i)} = -\log \frac{\exp\|\mathcal{F}(x_i)\|\cos\theta_{ki}}{\sum_{k'=1}^{K} \exp\|\mathcal{F}(x_i)\|\cos\theta_{k'i}}$$

Clearly, despite having the same direction, two features with different norms have different losses. From this perspective, the straightforward solution to regularize the loss and remove the influence of the norm is to normalize the features before Softmax. However, this approach is effectively a projection method, that is, it calculates the loss as if the features are normalized to the same scale, while the actual network does not learn to normalize features.

Figure 5:
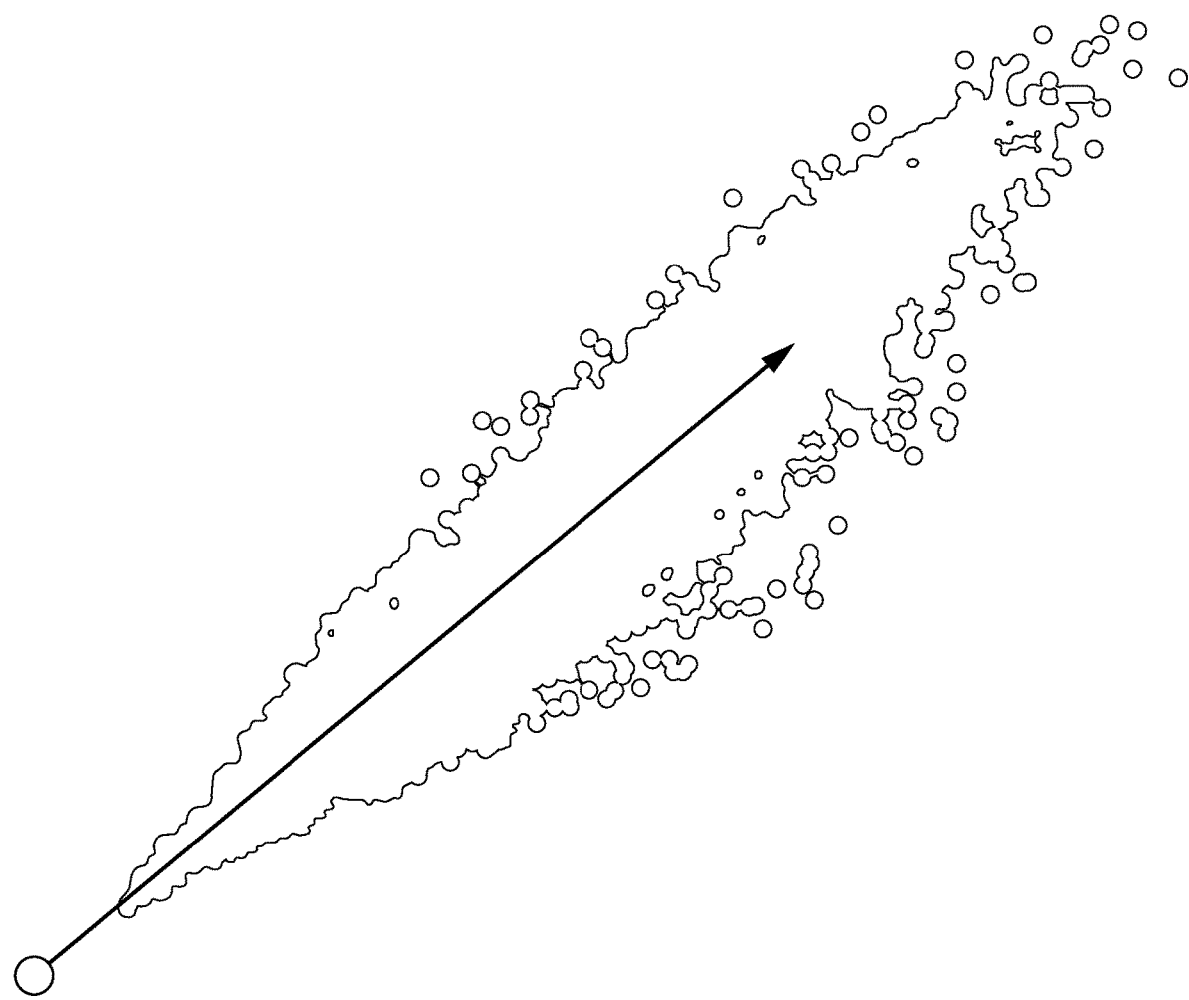
FIG. 5 shows features for a training set using vanilla Softmax as the loss function.
Figure 6:
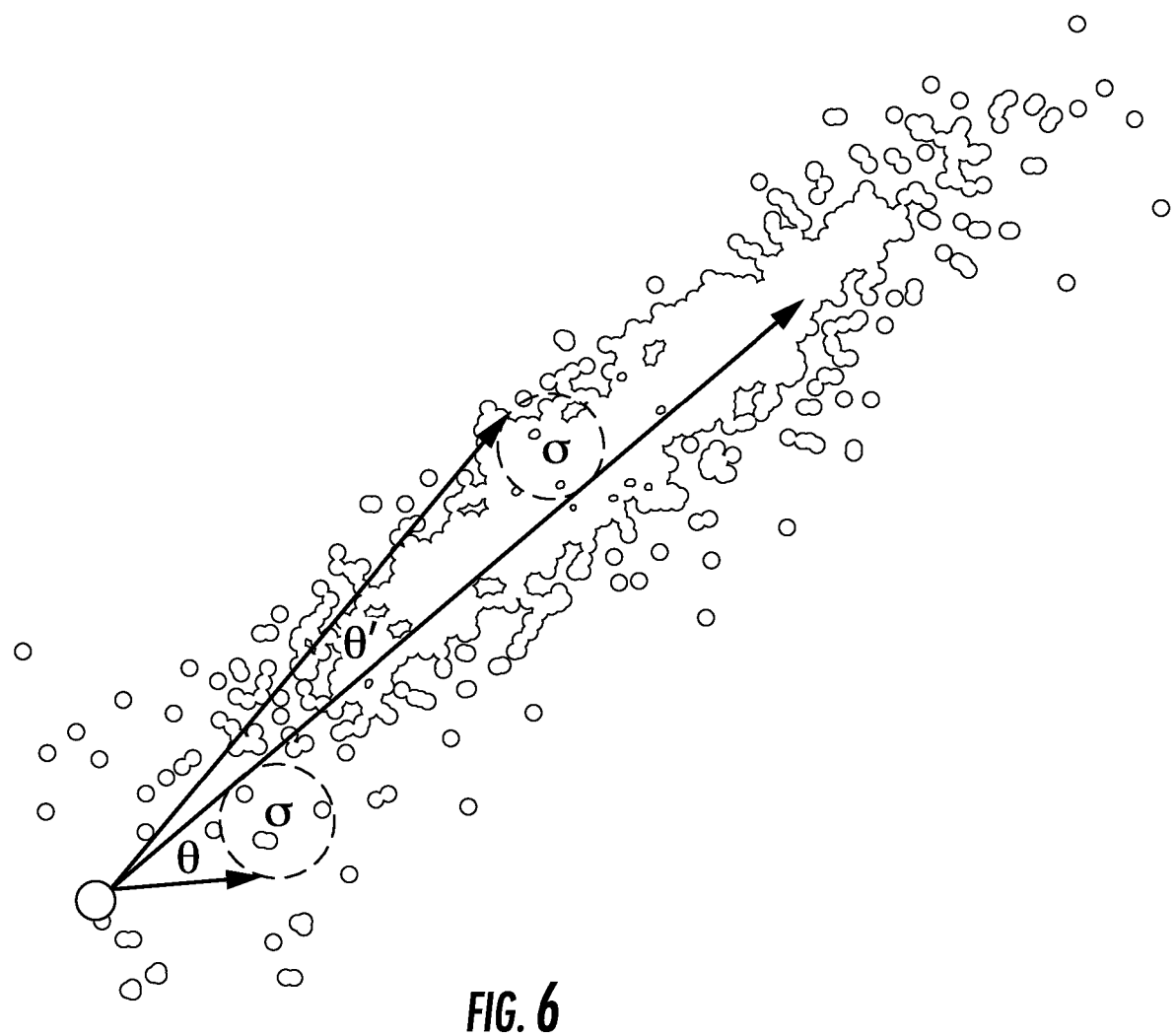
FIG. 6 shows features for a testing set using vanilla Softmax as the loss function.

The need for feature normalization in feature space. As an illustration, consider the training and testing set features trained by vanilla Softmax of the class 8 from MNIST in FIG. 1. FIG. 5 shows that at the end of training, the features are well behaved with a large variation in the norm of the features with a few samples with low norm. However, FIG. 6 shows that that the features for the test samples are much more erratic. There is a similar variation in norm but now most of the low norm features have huge variation in angle. Indeed, variation in samples for lower norm features translates to a larger variation in angle than the same for higher norm samples features. This translates to higher errors in classification under the cosine metric (as is commonly used in face recognition).

This is yet another motivation to normalize features during training. Forcing the network to learn to normalize the features helps to mitigate this problem during testing wherein the network learns to work in the normalized feature space.

Incorporating the norm constraint as a convex problem. Identifying the need to normalize the sample features from the network, the problem can now be formulated. If the primary loss function is defined as $L_S$ (for instance Softmax loss), and it is assumed that $\mathcal{F}$ provides deep features for a sample x as $\mathcal{F}$ (x), the loss subject can be minimized to the normalization constraint as follows $$\min L_S(\mathcal{F}(x)) s.t. \|\mathcal{F}(x)\|_2 = R$$

Here, R is the scale constant that the features are to be normalized to. Note that this problem is non-convex in $\mathcal{F}$ (x) because the set of feasible solutions is itself non-convex due to the norm equality constraint. Approaches which use standard SGD while ignoring this critical point would not be providing feasible solutions to this problem thereby, the network $\mathcal{F}$ would not learn to output normalized features. Indeed, the features obtained using this straightforward approach are not normalized compared to the Ring Loss method, shown in FIG. 2. One naive approach to get around this problem would be to relax the norm equality constraint to an inequality. This objective will now be convex, however it does not necessarily enforce equal norm features. To incorporate the formulation as a convex constraint, the following formula is directly useful.

Ring Loss Definition. Ring loss $L_R$ is defined as:

$$L_R = \frac{\lambda}{2m} \sum_{i=1}^{m} (\|\mathcal{F}(x_i)\|_2 - R)^2$$

where $\mathcal{F}(x_i)$ is the deep network feature for the sample $x_i$. Here, R is the target norm value which is also learned and $\lambda$ is the loss weight enforcing a trade-off between the primary loss function. m is the batch-size. The square on the norm difference helps the network to take larger steps when the norm of a sample is too far off from R, leading to faster convergence. The corresponding gradients are as follows.

$$\frac{\partial L_R}{\partial R} = -\frac{\lambda}{m} \sum_{i=1}^{m} (\|\mathcal{F}(x_i)\|_2 - R)$$

$$\frac{\partial L_R}{\partial \mathcal{F}(x_i)} = \frac{\lambda}{m} (\|\mathcal{F}(x_i)\|_2 - R) \frac{\mathcal{F}(x_i)}{\|\mathcal{F}(x_i)\|_2} = \frac{\lambda}{m} \left(1 - \frac{R}{\|\mathcal{F}(x_i)\|_2}\right) \mathcal{F}(x_i)$$

Ring Loss ($L_R$) can be used along with any other loss function such as Softmax or large-margin Softmax. The loss encourages norm of samples being value R (a learned parameter) rather than explicit enforcing through a hard normalization operation. This approach provides informed gradients towards a better minimum which helps the network to satisfy the normalization constraint. The network therefore, learns to normalize the features using model weights (rather than needing an explicit non-convex normalization operation, or batch normalization). In contrast, and in connection, batch normalization enforces the scaled normal distribution for each element in the feature independently. This does not constrain the overall norm of the feature to be equal across all samples and neither addresses the class imbalance problem nor the gap in the training and testing protocols in face recognition.

Figure 7:
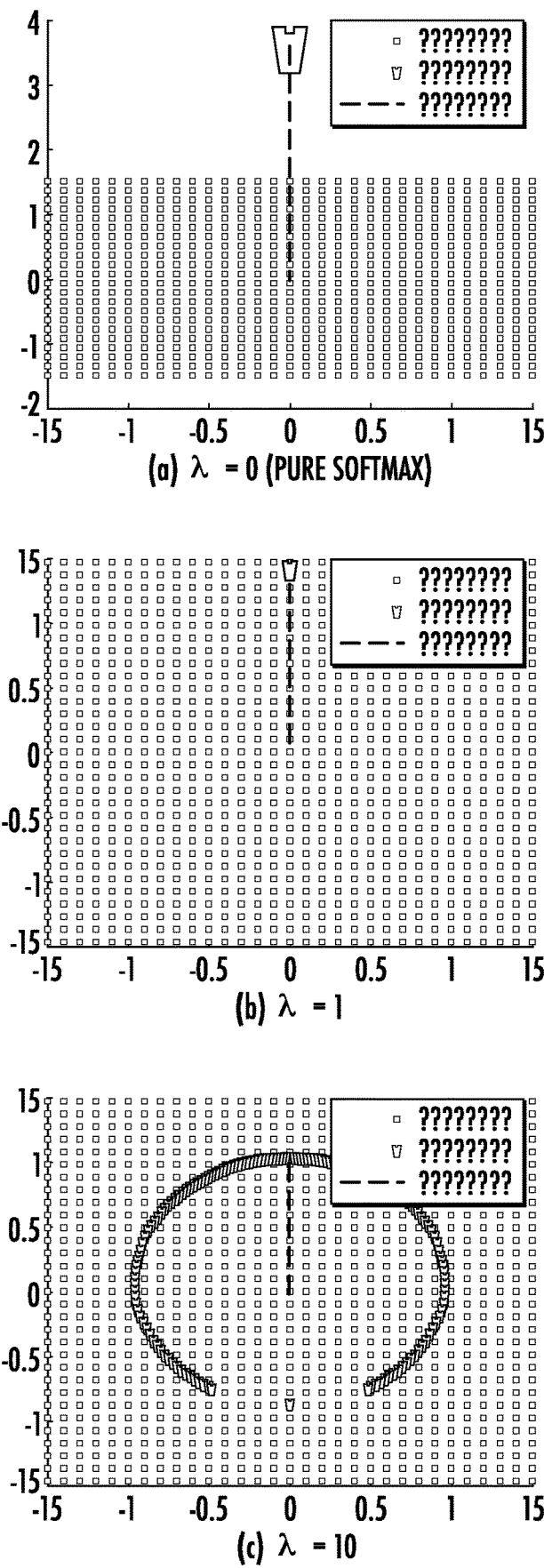
FIG. 7 shows Ring Loss visualizations, showing the final convergence of the samples for varying $\lambda$.

Ring loss Convergence Visualizations. To illustrate the effect of the Softmax loss augmented with the enforced soft-normalization, analytical simulations were conducted. A 2D mesh of points from (−1.5, 1.5) in (x,y)-axis were generated. The gradients of Ring Loss (R=1) were computed, assuming the vertical dotted line in FIG. 7B as the target class and update each point with a fixed step size for 20 steps. The simulation was run for $\lambda=\{0, 1, 10\}$. Note that $\lambda=0$ represents pure Softmax. FIG. 7 depicts the results of these simulations. Sub-figures (A-C) in FIG. 7 show the initial points on the mesh grid in light green and the final updated points in red. For pure Softmax ($\lambda=0$), shown in FIG. 7A, it can be seen that the updates increase the norm of the samples and, moreover, they fail to converge. For a reasonable loss weight of $\lambda=1$, shown in FIG. 7B, Ring Loss gradients can help the updated points converge much faster in the same number of iterations. For heavily weighted Ring Loss with $\lambda=10$, shown in FIG. 7C, it can be seen that the gradients force the samples to a unit norm since R was set to 1 while overpowering Softmax gradients. These figures suggest that there exists a trade-off enforced by $\lambda$ between the Softmax loss $L_S$ and the normalization loss.

A method of training using a primary loss function augmented by a Ring Loss function has been presented in which the network learns to normalized features as they are extracted. The Ring Loss method was found to consistently provide significant improvements over a large range of the hyperparameter $\lambda$. Further, the network learns normalization, thereby being robust to a large range of degradations.

We claim:

1. A method, in a deep neural network, for normalizing a feature vector comprising:
    providing the deep neural network with an input;
    extracting the feature vector, the feature vector representing the input, using the deep neural network;
    generating a loss, the loss calculated by a primary loss function augmented by a secondary loss function that constrains radial classification of the primary loss function to classification regions centered around a radius of a circle; and
    back-propagating the loss into the deep neural network;
    wherein the value of the radius is learned over a plurality of iterations of the method; and
    wherein the augmented primary loss function is minimized for the feature vector as a function of a difference between a norm of the feature vector and the learned value of the radius.

2. The method of claim 1 wherein the secondary loss function includes a loss weight enforcing a trade-off between the primary loss function and the secondary loss function.

3. The method of claim 2 further comprising adjusting the value of the radius based on a gradient function representing a derivative of the secondary loss function with respect to a derivative of the radius.

4. The method of claim 3 wherein the derivative of the secondary loss function with respect to the derivative of the radius is of the form:

$$\frac{\partial L_R}{\partial R} = -\frac{\lambda}{m} \sum_{i=1}^{m} (\|\mathcal{F}(x_i)\|_2 - R)$$

where:

R is the radius;

λ is the loss weight;

F(x*i*) is the feature vector for sample x*i*; and m is a batch size.

5. The method of claim 3 further comprising adjusting the feature vector based on a gradient function representing the derivative of the secondary loss function with respect to a derivative of the feature vector.

6. The method of claim 5 wherein the derivative of the secondary loss function with respect to the derivative of the feature vector is of the form:

$$\frac{\partial L_R}{\partial \mathcal{F}(x_i)} = \frac{\lambda}{m}\left(1 - \frac{R}{\|\mathcal{F}(x_i)\|_2}\right)\mathcal{F}(x_i)$$

where:

R is the radius;

λ is the loss weight;

F(x$_i$) is the feature vector for sample x$_i$; and m is a batch size.

7. The method of claim 2 wherein the secondary loss function is of the form:

$$L_R = \frac{\lambda}{2m}\sum_{i=1}^{m}(\|\mathcal{F}(x_i)\|_2 - R)^2$$

where:

λ is the loss weight;

F(x$_i$) is the feature vector for sample x$_i$;

R is the radius; and m is a batch size.

8. The method of claim 1 wherein the norm of the feature vector is a L2 norm.

9. The method of claim 1 wherein the primary loss function is a Softmax function.

10. The method of claim 1 further comprising classifying each feature vector using the primary loss function.

11. The method of claim 1 wherein each feature vector has n dimensions.

12. The method of claim 1 wherein classification of each feature vector is given by its direction and further wherein the length of each feature vector is normalized to the radius of the scaled unit circle.

13. The method of claim 1 wherein the radius of the scaled unit circle is a circumference of a hypersphere.

14. The method of claim 1 wherein the augmented loss function comprises a weight with respect to the primary loss function.

* * * * *